(12) United States Patent
Penny

(10) Patent No.: US 12,729,129 B2
(45) Date of Patent: Sep. 8, 2026

(54) DIRECT WRITE ADDITIVE MANUFACTURING OF IONIC MATERIALS

(71) Applicant: Penny Precision LLC, Nashua, NH (US)

(72) Inventor: Ryan Wade Penny, Merrimack, NH (US)

(73) Assignee: Penny Precision, LLC, Nashua, NH (US)

( * ) Notice: Subject to any disclaimer, the term of this patent is extended or adjusted under 35 U.S.C. 154(b) by 39 days.

(21) Appl. No.: 18/950,004

(22) Filed: Nov. 16, 2024

(65) Prior Publication Data

US 2025/0178918 A1 Jun. 5, 2025

Related U.S. Application Data

(60) Provisional application No. 63/605,175, filed on Dec. 1, 2023.

(51) Int. Cl.

| | |
|---|---|
| ***B29C 64/106*** | (2017.01) |
| ***B33Y 10/00*** | (2015.01) |
| ***B33Y 30/00*** | (2015.01) |
| ***B33Y 50/02*** | (2015.01) |
| ***B33Y 70/00*** | (2020.01) |
| ***C01D 15/04*** | (2006.01) |
| ***C01F 11/22*** | (2006.01) |

(52) U.S. Cl.
CPC ............... *C01F 11/22* (2013.01); *B33Y 10/00* (2014.12); *B33Y 30/00* (2014.12); *B33Y 50/02* (2014.12); *B33Y 70/00* (2014.12); *C01D 15/04* (2013.01); *C01P 2006/60* (2013.01)

(58) Field of Classification Search
CPC .... B29C 64/357; B29C 64/159; B29C 64/106
See application file for complete search history.

(56) References Cited

U.S. PATENT DOCUMENTS

| | | | |
|---|---|---|---|
| 1,160,553 | A | 11/1915 | Whalen |
| 7,242,843 | B2 | 7/2007 | Clar |
| 7,489,441 | B2 | 2/2009 | Scheible |
| 8,125,611 | B2 | 2/2012 | Chang |
| 8,831,056 | B2 | 9/2014 | Savchenkov |

(Continued)

OTHER PUBLICATIONS

Tu, R., E. Sprague, H.A. Sodano, Precipitation printing towards diverse materials, mechanical tailoring and functional devices, Additive Manufacturing vol. 35 (2020), 11 pages. (Year: 2020).*

(Continued)

*Primary Examiner* — Matthew J Daniels
(74) *Attorney, Agent, or Firm* — Ryan Wade Penny

(57) ABSTRACT

Methods and systems for direct-write liquid phase epitaxy of ionic materials are provided for herein, and relate to the manufacture of metal halide optics among other applications. Deposition of the ionic material is induced by mixing at least two fluids of differing composition, wherein the solubility limit of the ionic material in the mixed solution is lower than predicted from a linear combination of the original fluids. This deposition process is spatially controlled using a printhead, enabling localized material deposition and the ability to create arbitrary geometries in turn. In some cases, at least one of the fluids is saturated with the ionic material and surrounds the substrate upon which deposition occurs.

9 Claims, 10 Drawing Sheets

(56) References Cited

U.S. PATENT DOCUMENTS

| | | | | |
|---|---|---|---|---|
| 9,331,277 | B2 | 5/2016 | Chen | |
| 9,360,778 | B2 | 6/2016 | Chen | |
| 9,469,549 | B2 | 10/2016 | Wang | |
| 9,818,893 | B2 | 11/2017 | Wang | |
| 10,005,308 | B2 | 6/2018 | Millward | |
| 10,571,606 | B2 | 2/2020 | Altug | |
| 10,838,123 | B2 | 11/2020 | Jaiswal | |
| 11,005,058 | B2 | 5/2021 | Zhou | |
| 11,683,952 | B2 | 6/2023 | Ikeda | |
| 2010/0261304 | A1* | 10/2010 | Chang | H10F 71/00 257/E51.026 |
| 2012/0145769 | A1* | 6/2012 | Whitfield | C23C 26/02 228/41 |
| 2018/0281295 | A1* | 10/2018 | Tibbits | B29C 64/40 |
| 2021/0260249 | A1* | 8/2021 | Alimperti | A61L 27/446 |
| 2022/0001597 | A1* | 1/2022 | Sodano | B29C 64/106 |
| 2024/0072206 | A1 | 2/2024 | Atanackovic | |

OTHER PUBLICATIONS

Karyappa, R., A. Ohno, M. Hashimoto, Immersion precipitation 3D printing (IP3DP), Materials Horizons, vol. 6, No. 9 (Nov. 2019), pp. 1834-1844. (Year: 2019).*

Symmons, Field Guide to Infrared Optical Materials, Book, International Society for Optical Engineering, 2021.

Senguttuvan, Oriented growth of large size calcium fluoride single crystals for optical lithography, Journal of Crystal Growth, 2005.

Yanagi, Properties of large CaF2 crystals grown by CZ method for lens materials, Optical Microlithography XVII, 2004, International Society for Optics and Photonics.

Champion, The electrical conductivity of synthetic fluorite, British Journal of Applied Physics, 1965.

Cockayne, Calcium fluoride: Slip and Polygonization during crystal growth, Nature, 1964.

Gerhard, Optics Manufacturing: Components and Systems, Book, 2017, CRC Press.

Lormeau, Field proven technologies for fabrication of high-precision aspheric and freeform optical surfaces, Optics and Measurement Conference, 2014, International Society for Optics and Photonics.

Zhong, High precision processing CaF2 application research based on the magnetorheological finishing technology, Optifab, 2017, International Society for Optics and Photonics.

Golini, Magnetorheological finishing (MRF) in commercial precision optics manufacturing, Optical Manufacturing and Testing III, 1999, International Society for Optics and Photonics.

Zhu, Compliant Grinding and Polishing: A Review, International Journal of Machine Tools and Manufacture, 2020.

Chen, Effect of crystallographic orientation on mechanical removal of CaF2, Wear, 2017, International Conference on Wear of Materials.

Liu, Ductile Mode Cutting of Calcium Fluoride, Book, 2020, Springer.

Mizumoto, Influence of crystal anisotropy on subsurface damage in ultra-precision cylindrical turning of CaF2, Precision Engineering, 2017.

Stringfellow, Epitaxy, Reports on Progress in Physics, 1982.

Shyu, The kinetics of the crystallization of calcium fluoride, a new constant composition method, Croatica Chemica Acta, 1980.

Goldstein, Fabrication and testing of a uas-based visible to extended-swir hyperspectral sensor, WHISPERS, 2019.

Teh, Droplet microfluidics, Lab Chip, 2008, Royal Society of Chemistry.

Guendouzi, Chemical speciation of aqueous hydrogen fluoride at various temperatures from 298.15K to 353.15K, Fluid Phase Equilibria, 2019.

Pan, Solubility of calcium fluoride and fluorapatite by solid titration, Archives of Oral Biology, 2007.

Aigueperse, Fluorine compounds Inorganic, Book, 2000, John Wiley & Sons.

Jache, Solubility of fluorides of metals in liquid hydrogen fluoride, The Journal of Physical Chemistry, 1952.

Kongpricha, Studies in the hydrogen-fluoride solvent, PhD Thesis, 1960, Purdue University.

Nikolaev, Complex fluoride compounds in binary and ternary systems, Ivz. Sib. Otd. Akad. Nauk, 1968 (In Russian, no translation is known to applicant. Applicant understands this reference to provide ternary equilibrium diagrams for a variety of fluoride salts in H2O-HF-Salt systems in a selection of its figures.).

Langmyhr, An investigation of the solubility of some fluorides in 38.5% hydrofluoric acid, Analytica Chimica Acta, 1969.

Beutler, Metrology for the production process of aspheric lenses, Advanced Optical Technologies, 2016.

Lucas, Fluorine in Optics, Journal of Fluorine Chemistry, 2002.

Stevenson, Fluoride materials for optical applications: Single crystals, ceramics, classes, and glass-ceramics, Journal of Fluorine Chemistry, 2011.

Capper, Liquid Phase Epitaxy of Electronic, Optical and Optoelectronic Materials, 2007, John Wiley & Sons, West Sussex, England.

Ghosh, Fabrication of Optical Components by Ultraprecision Finishing Processes, 2018, Springer International Publishing, Cham, Switzerland.

Moller, Growth Kinetics of Calcium Fluoride, 1985, Journal of Crystal Growth, 71, Amsterdam, Netherlands.

Pritula, Fundamentals of Crystal Growth from Solutions, Handbook of Crystal Growth, 2015, Elsevier, Amsterdam, Netherlands.

Senguttuvan, Oriented growth of large size calcium fluoride single crystals for optical lithography, 2005, Journal of Crystal Growth, 280, Elsevier, Amsterdam, Netherlands.

Tagirov, Zinc Complexation in aqueous sulfide solutions: Determination of the stoichiometry and stability of complexes via ZnS(cr) solubility measurements at 100 C and 150 bars, 2007, Geochimica et Cosmochimica Acta, 71, Elsevier, Amsterdam, Netherlands.

Yan, Single-point diamond turning of CaF2 for nanometric surface, 2004, International Journal for Advanced Manufacturing Technology, 24, Springer-Verlag, London.

* cited by examiner

DIRECT WRITE ADDITIVE MANUFACTURING OF IONIC MATERIALS

CROSS REFERENCE TO RELATED APPLICATION

The present disclosure claims priority to U.S. Provisional Application No. 63/605,175, entitled "Direct Write Additive Manufacturing of Ionic Materials," which was filed on Dec. 1, 2023 and which is incorporated by reference herein in its entirety.

FIELD

The present disclosure relates to a direct-write epitaxial process for additive manufacturing of components from ionic materials, and more particularly concerns a liquid-phase epitaxial process for metal halides where material deposition occurs due to the local mixing of at least two fluids, wherein deposition is spatially controlled for fabrication of arbitrary shapes including lenses, diffractive optical structures, microfluidics, and microelectromechanical systems.

BACKGROUND

Metal fluoride optical materials provide uniquely desirable optical properties, including high transmission spanning from the deep ultraviolet (UV) to long-wave infrared (IR). Accordingly, they are uniquely suited to UV photolithography equipment for manufacturing semiconductors and, at the other extreme, enable thermal imaging for remote sensing and defense applications in the IR. Despite their advantages, however, these materials are seldom used outside of mission-critical applications due to their prohibitively high cost, which is driven by two factors. First, it reflects the extremely resource-intensive process of crystal growing and annealing to create lens blanks from feedstock, wherein material is held at high temperatures for weeks to months. Second, considerable expertise and highly specialized equipment is required to polish near-net-shape lens blanks to angstrom-scale surface finishes.

The conventional manufacturing process begins by crystal growing from a molten feedstock by one of either the Czochralski or Stockbarger methods. Both of these techniques begin with melting the feedstock that, via thermal gradient, is allowed to crystallize on a seed crystal. Clearly, this process occurs at high temperatures (e.g., $CaF_2$ melts at about 1423° C.) and the linear growth rate is typically only on the order of around 1 mm/hr. Due to the high residual stress generated in the material, it is next slowly cooled (usually no faster than about 20° per hour) to prevent cracking. To relieve the thermally-induced residual stress, the crystal is then reheated and annealed at a temperature of approximately 1000° C. for timescales that may span weeks to months. In addition to improving the mechanical properties of the material, this step also reduces stress-induced birefringence of the crystal. Much of the value of a finished metal fluoride optic represents the energy expenditure inherent to performing these energy-intensive, high-temperature processing steps. Moreover, these operations require highly specialized expertise and costly bespoke processing equipment that represent an extremely high barrier to entry, especially at small volumes. Accordingly, crystals or pre-cut lens blanks of optical-grade material are only available from a handful of large suppliers.

From here, a range of processes are employed to generate optical-quality surfaces on the roughly cut lens blanks. Only the simplest (i.e., planar, spherical and modestly-aspherical) shapes can be generated with conventional grinding and polishing techniques. Even for these simple shapes, polishing metal fluoride optical surfaces is a challenge due to their material properties, and therefore exotic processes are preferred for optics destined for either UV or high-power (laser) applications. A popular, albeit geometrically-limiting process for surface refinement of these materials is magnetorheological polishing, among more specialized options. Diamond-turning is an alternative for creating optics from these materials, especially those comprising freeform shapes for IR applications. However, the anisotropic material properties arising from the crystal structure complicate optimization of cutting parameters, and this limits surface quality in turn. Subsurface cracking is a related problem, as diamond turning causes damage extending 10-100 μm below the surface, and this causes light scattering intolerable in UV and laser applications. Thus, highly specialized (and, therefore, highly expensive) manufacturing processes are required and often limit component quality and geometry.

Accordingly, there exists a need for an environmentally benign, low-temperature process for printing precision metal halide parts, among similar materials, with an increased geometric design space. The invention described herein generally fills this need through combining aspects of liquid phase epitaxy with the geometric freedom of additive manufacturing. The epitaxial growth process disclosed can provide essentially isothermal material deposition. This process relies on nonlinear behavior when at least two solutions are mixed are used to cause a driving force for crystallization, and thereby minimizes or prevents thermal residual stress. Spatial control of material deposition is also provided, where a printhead is used to control the location and rate of mixing of the at least two solutions, and enables arbitrary geometries to be printed in turn.

BRIEF SUMMARY

The systems, devices, and methods described herein generally relate to epitaxial growth of ionic materials, which may be a metal halide or metal chalcogenide as nonlimiting examples, from liquid solutions.

This invention first provides a method for material deposition, wherein deposition results from combining at least two, initially separate solutions. At least one of the solutions comprises dissolved ionic material feedstock. When combined, a solubility limit of the ionic material in the resulting mixed or composite solution is below the amount of dissolved feedstock; that is, the solution becomes supersaturated with the dissolved ionic material. A portion of the dissolved ionic material then crystallizes on a substrate. As provided for herein, this process is spatially controlled using a printhead, enabling arbitrary structures to be fabricated. As no temperature gradient is necessary to cause material deposition, the process can create ionic material structures free from thermally-induced residual stress.

Further, methods for selecting a nominal composition of at least two fluids are provided, as well as a procedure for determining a nominal ratio in which they are mixed, to cause the supersaturation of, and hence material deposition from, the mixed solution. In some aspects of the invention, this arises from nonlinear behavior of either the dissolved ionic material, a corresponding acid in a solution comprising a liquid solvent, or a combination thereof. As potential nonlimiting examples, nonlinearly may also arise from the formation of polymers or complexes of an acidic species corresponding to an element or ionic species also present in the ionic material.

The present invention further provides systems for dispensing such fluids via a printhead. Fluid dispensed from the printhead may form a mixing zone when mixed with a second fluid surrounding the exit of the printhead flow channel and the substrate. If the mixture of these fluids in the mixing zone has a solubility limit lower than the amount of feedstock supplied, material will be deposited from the mixing zone onto the substrate. A printhead may have many flow channels to supply fluids for deposition and may also have flow channels designed to remove fluid from the mixing zone, especially where the mixture is depleted of feedstock. The standoff distance of the printhead is also critical, and may be set via feedforward control, feedback control, or a combination thereof. Multiple printheads may be used for a variety of reasons, including to simultaneously deposit material in multiple locations to improve the build rate or access different surfaces of the substrate.

Systems for controlling the operation of a printer to deposit material are also disclosed. This may include a controller configured to receive a recipe defining the machine motions, actuations, and other functions necessary to enable targeted deposition of the material with a printhead, as to fabricate an arbitrary component. The recipe may encode other aspects and instructions, including but not limited to where a material gradient or dopant should be incorporated in the part. When a plurality of printheads is present in a specific embodiment, the recipe may also encode or synchronize their motion, dispensing, and other aspects of their operation. Printhead motion may occur in any number of dimensions at any time, sequentially or synchronously, including translations or rotations. Various in-situ and ex-situ quality control and process monitoring sensing subsystems may also be incorporated, and the controller configured to receive the measurements. As such, a controller may be able to alter any number of process parameters corresponding to any subsystem to improve the fidelity of the printed component.

Further still, methods are provided for fabrication of multi-material objects. Sometimes, this may be performed by changing the composition of at least one of the fluids as a component is printed to cause a second ionic material to be deposited. In other cases, additional fluids may be used to deposit other materials, particularly where changes in composition are desirable at fine length scales. Further still, a dopant material may also be incorporated in one or more of the fluids, such that it becomes embedded in the deposited material without depending on the crystallization method described.

Systems are also described for recycling and conditioning the fluids used for material deposition. Primarily, these operations serve to minimize waste and maximize productivity, but may be employed for any other reason that benefits the process. These systems are generally configured to receive a fluid, and perform a range of unit operations before returning the fluid to the printing environment. The only distinction drawn between recycling and conditioning is that the former receives an effluent stream from the printing process and, as such, may require more complex processing to separate waste and to generate at least one output fluid for reuse in the deposition process. Sensors may be used to instrument the recycling and conditioning process. An output from such a sensor may be recorded for quality control. Additionally, or alternatively, an output from a sensor may be used for closed-loop feedback control various operations in the recycling or conditioning.

The present invention also relates to manufactured articles. In some cases, the manufactured article may have features that are difficult or impossible to manufacture using conventional means. This may relate to a surface profile, particularly those with discontinuous profiles or those with feature sizes between the nanometer and millimeter scales. Further, articles fabricated with the present invention may achieve a gradient or other spatially-defined material composition. As such, the present invention provides for the manufacture of waveguides, immersion optics, and gradient-index optical devices. Likewise, the fine resolution of material deposition enables applications in contact lithography and microfluidics, among a range of other potential applications.

A person skilled in the art will recognize that many other systems, methods, and articles are provided for, or are otherwise derivable from, the examples provided in this summary and the following detailed description. Accordingly, these embodiments are by no means limiting, and only provide examples of how the present invention may be implemented or utilized.

BRIEF DESCRIPTION OF THE DRAWINGS

The disclosure will be more fully understood by way of the accompanying drawings, in which.

DETAILED DESCRIPTION

Figure 1:
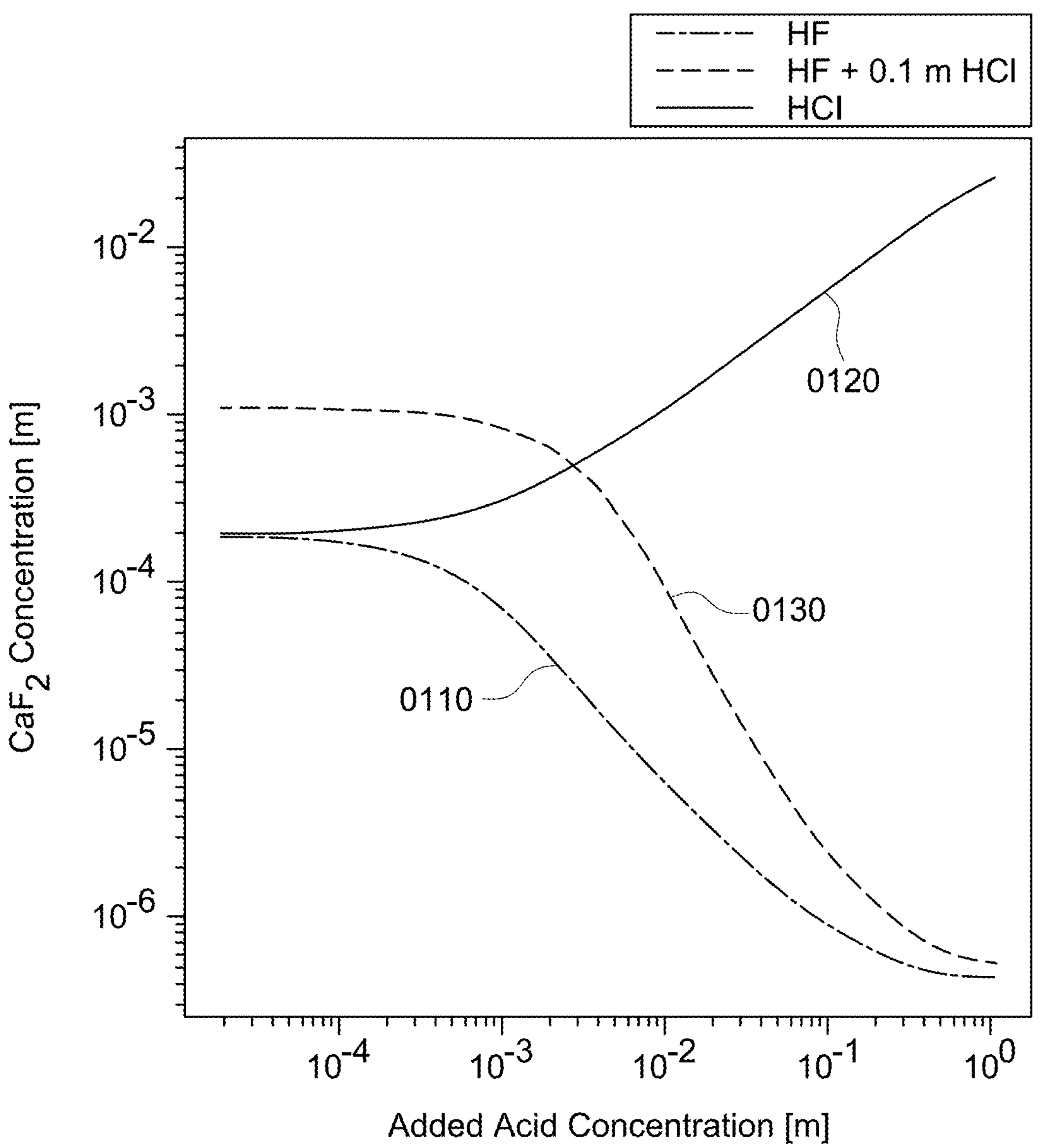
FIG. 1 is a representation of the solubility of calcium fluoride in a selection of fluids of different composition.

The present invention provides systems, methods, and devices for direct-write additive manufacturing of ionic materials, wherein material deposition occurs due to a nonlinear change in the solubility of the desired ionic material when at least two solutions are mixed. The nature of the deposited material may be polycrystalline, or the process may be operated for epitaxial deposition.

Nomenclature

To assist the reader in interpreting this description, the following conventions are made:

Numerous fluids, liquids, and solutions are referred to, and these terms are interchangeable unless otherwise noted. No specific composition is implied by the term used. Further, the term solution may, as used here for brevity, be a solvent or solvent solution without any of the intended solute dissolved therein. In some cases, the terms “bath” or “saturated bath” may be used to refer to a fluid, particularly where it surrounds the substrate or a portion of the substrate proximal to where printing is performed.

References are made to the fully fabricated article or article undergoing fabrication. It may be referred to as, interchangeably, a part, component, lens, optic, or article. This is not intended to imply that fabrication of the article is complete. Where a distinction must be drawn between an incomplete and complete article, the incomplete article is sometimes referred to as a part-in-progress or by similar terms. Similarly, the term substrate is used to describe a piece of material upon which feedstock is deposited and becomes integral to the fabricated part. As such, this term may be interchanged with part or part-in-progress unless otherwise indicated. Machine components that comprise the physical apparatus used for deposition, to be distinguished from a printed component, are generally referred to as such.

Several terms are used to describe the process by which material is added to a substrate, and are interchangeable unless otherwise noted in a specific context. These terms include crystallized, deposited, printed, and grown, and similar terms in other tenses. In some cases, epitaxial growth is referred to. This should be considered a sub-case of deposition in which the deposited material has a specific crystal orientation or structural relationship with the substrate crystal orientation and structure. The deposition processes described herein are all capable of polycrystalline or epitaxial growth, unless otherwise noted.

Likewise, a number of terms are used to describe a material or chemical compound deposited to form an article, including ionic material, ionic compound, feedstock, material, build material, and similar words unless otherwise indicated.

A number of terms, including but not limited to printer, system, machine, and apparatus, may be interchangeable depending on context and are used to describe the physical hardware to implement the invention. In some cases, a collection of hardware intended to perform a specific function may be referred to as a machine element or subsystem.

Solubility and Crystallization of Ionic Materials

The present invention relies aspects of the behavior of solutions, where a solution may be formed by dissolving an ionic compound in a solvent. In the solid phase, the ionic compound can be modeled as a crystal lattice of bound anions (ions of negative charge) and cations (ions of positive charge). If this solid phase is placed in a solvent, some of the ionic compound may dissolve, forming ionic species in the solution. As used herein, the ionic material is any ionic material and the solvent may be any suitable solvent, so long as this process occurs. If a sufficient (excess) amount of the ionic compound is provided, this dissolution process will continue until the solubility limit of the ionic compound in the solution is reached at an equilibrium.

One knowledgeable in the art will recognize that many factors affect the solubility limit of a given ionic compound in a solution. For example, the solubility limit may be a function of temperature. In some cases, the solubility limit may increase with temperature. In other cases, which may be referred to as retrograde or inverse solubility, the solubility may increase with decreasing temperature. Solubility may be impacted by other physical parameters, such as pressure.

In some cases, it is possible for more of an ionic compound to be dissolved in a solution than the solubility limit; this condition is known as supersaturation. This will be recognized as a metastable state by one skilled in the art. As a nonlimiting example of how supersaturation may be achieved, a solution may be brought to equilibrium at a first temperature, then cooled to a second temperature where the solubility limit is lower. If supersaturation occurs in the presence of the solid phase, such as by inserting a seed crystal, a portion of the dissolved ionic compound may crystalize onto the solid phase until equilibrium is achieved at the new, lower solubility limit. Alternatively, crystallization may proceed spontaneously from a nucleation point, from which it will also proceed to equilibrium. The degree of supersaturation may be quantified, typically as a multiple of the nominal solubility limit. Higher degrees of supersaturation may provide a greater driving force, taken to be the combination of factors that promote the formation and growth of crystals from a solution crystallization, and therefore may impact the rate of material crystallization.

Aspects of the present invention rely on achieving supersaturation by mixing or otherwise combining at least two different solutions in a ratio, wherein none of the original solutions are supersaturated. This requires a nonlinear behavior of the solutions when they are mixed, and this nonlinearity may have a number of useful origins.

As such, one skilled in the art will recognize that, polymerization, homoassociation, homoconjugation, or other similar interactions can contribute to nonlinear changes in the solubility limit of an ionic material. In some cases, the underlying mechanism of these may be hydrogen bonding. As a nonlimiting example, in aqueous solutions HF forms a number of compounds such as $HF_2^-$, $H_2F_3^-$, among other species that influence the behavior of this nominal compound in $CaF_2^-$ HF—$H_2O$ systems.

As a similar nonlimiting example, zinc sulfide is a material with optical applications. One skilled in the art will similarly recognize that a range of complex ions form in the ZnS—$H_2S$—$H_2O$ system, and particularly so at elevated temperature and pressure. The interactions of these ions and complexes, such as $Zn^{2+}$, $ZnSHS^-$, $Zn(HS)_3^-$, and $Zn(HS)_2$, are nonlinear as a function of $H^+$ concentration. Accordingly, one skilled in the art will recognize how two or more fluids may be designed that cause deposition of zinc sulfide when mixed, as a consequence of a lower solubility limit in the mixture than the amount of ZnS supplied thereto by the original fluids.

In some cases, it is possible to approximately model the behavior of the solution. Returning to the $CaF_2$—HF—H2O system, FIG. 1 illustrates this nonlinear behavior more precisely, wherein the solubilities of $CaF_2$ in aqueous solutions have been modeled using PHREEQC (PHREEQC is a multi-purpose program provided by the U.S. Geological Survey that incorporates state-of-the-art solubility models including the specific ion interaction (SIT) and Pitzer methods.) One skilled in the art will recognize that there are a number of alternative methods for modeling solubility, and the behavior of ions in solution more generally, and that the present example is a nonlimiting example for illustration.

Beginning with curve 0110 in this figure, the solubility of $CaF_2$ is plotted versus (nominally added) HF acid concentration, which shows a decreasing sigmoidal shape. At the far-left end of this curve (i.e., at zero added acid), the primary mechanism is simply dissolution of a solid phase of $CaF_2$ into an aqueous phase, according to the relation:

$$CaF_{2(s)} \rightleftharpoons Ca^{2+}_{(aq)} + 2F^{-}_{(aq)}, \quad \text{(Eq. 1)}$$

wherein the subscripts(s) and (aq) denote solid and aqueous phases, respectively, and the double arrow indicating that the process is reversible. Dissolution continues until the solubility limit of CaF2 in H2O is reached, which may be approximated per:

$$K_{sp} = [Ca^{2+}_{(aq)}][F^{-}_{(aq)}]^2, \quad \text{(Eq. 2)}$$

where $K_{sp}$ is known as the solubility product constant, and the brackets denote the concentration of the bracketed species. Moving to the right on this curve, HF is added to the solution to achieve a nominal concentration of added acid. A fraction of the HF dissociates per:

$$HF \rightleftharpoons H^+ + F^-, \quad \text{(Eq. 3)}$$

where subscripts are omitted as all species are aqueous. HF is a weak acid, or does not fully dissociate in dilute aqueous solutions, thus a second simultaneous equilibrium occurs according to:

$$K_a = \frac{[H^+][F^-]}{[HF]}, \quad \text{(Eq. 4)}$$

where $K_a$ is the dissociation constant of the acid (HF), and again the brackets denote the concentration of the acidic species. Accordingly, in dilute solutions, adding HF reduces the amount of $CaF_2$ that can be dissolved as the increased [F$^-$] serves to drive Eq. 1 to the left. One skilled in the art will recognize this as a result of Le Chatelier's Principle. In the general case, however, it is impossible to reduce the amount of $CaF_2$ dissolved in the $CaF_2$—HF—$H_2O$ system to an arbitrarily low level by continuing to add HF. This results from complex ions that form in solution by, for example, $$HF + F^- \rightleftharpoons HF_2^-, \quad \text{(Eq. 5)}$$

among more complicated complexes. This accounts for the trend towards a constant level for right end of this curve, at around $10^0$ m.

Figure 2:
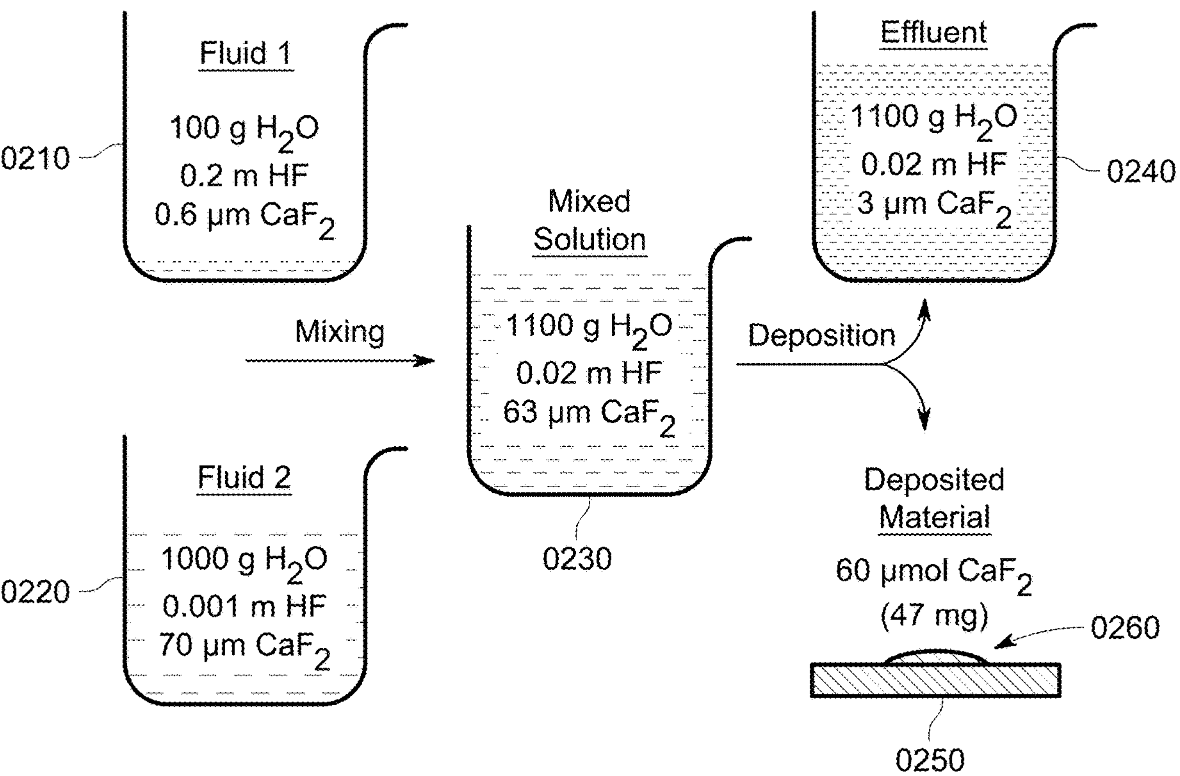
FIG. 2 is a schematic representation showing the mixing of two fluids in a defined ratio as to cause material deposition.

Using this development, FIG. 2 considers a deposition process engineered around the left inflection point of curve 0110 in FIG. 1, at an HF concentration of approximately $10^{-1}$ molal (henceforth designated m). A first solution 0210, representing the saturated bath in some embodiments of a printing machine, is chosen to have an HF concentration of about 0.2 m, wherein the solubility limit of $CaF_2$ is about 0.6 μm. A second solution 0220 is chosen from the opposite side of the nonlinear inflection point, where the lower concentration of HF enables more $CaF_2$ to be dissolved (concentrations of about 0.001 m HF and about 70 μm $CaF_2$, respectively). Mixing approximately 1 part of the first solution to 10 parts of the second solution results in a final nominal HF concentration of around 0.02 m in a mixed solution 0230, where FIG. 1 shows the saturation concentration of $CaF_2$ is around 3 μm. As approximately a 63 μm net concentration of $CaF_2$ is supplied by the inputs, deposition occurs until the $CaF_2$ until the concentration falls to around 3 μm at equilibrium. This is illustrated in FIG. 2 as a volume of deposited material 0260 on a substrate 0250. If a total of approximately 1 kg of mixed solution is produced in this example, about 47 mg of $CaF_2$ could be deposited. After deposition occurs, the feedstock-depleted mixed solution may be referred to as effluent 0240.

Figure 3:
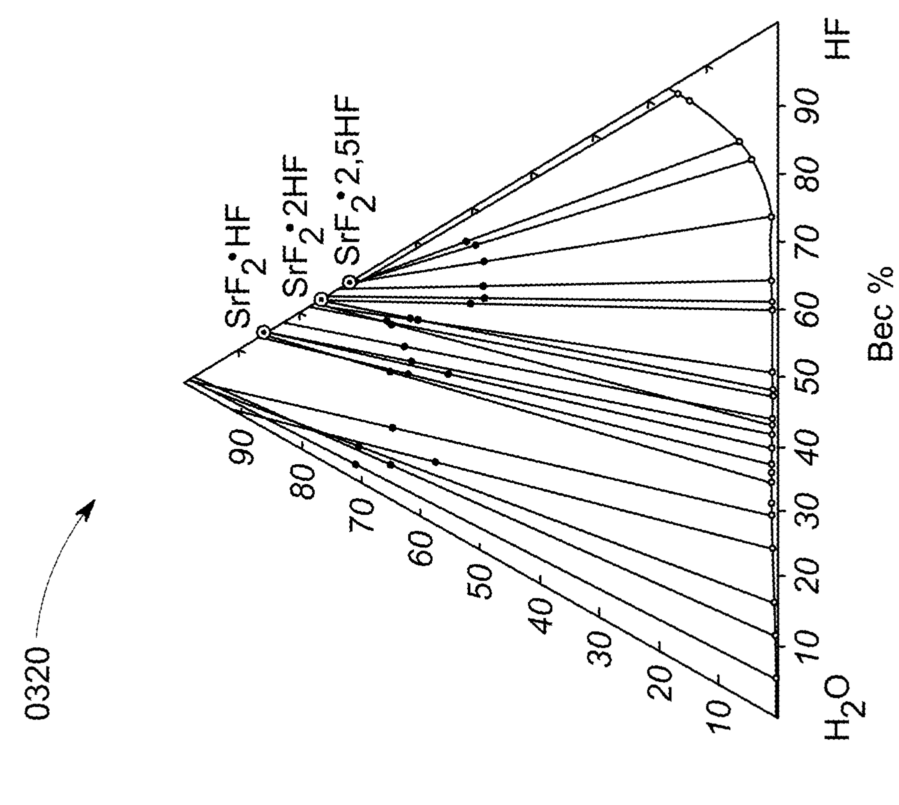
FIG. 3 is prior art depicting ternary phase diagrams of $CaF_2$—HF—$H_2O$ and $SrF_2$—HF—$H_2O$ systems.
Figure 3:
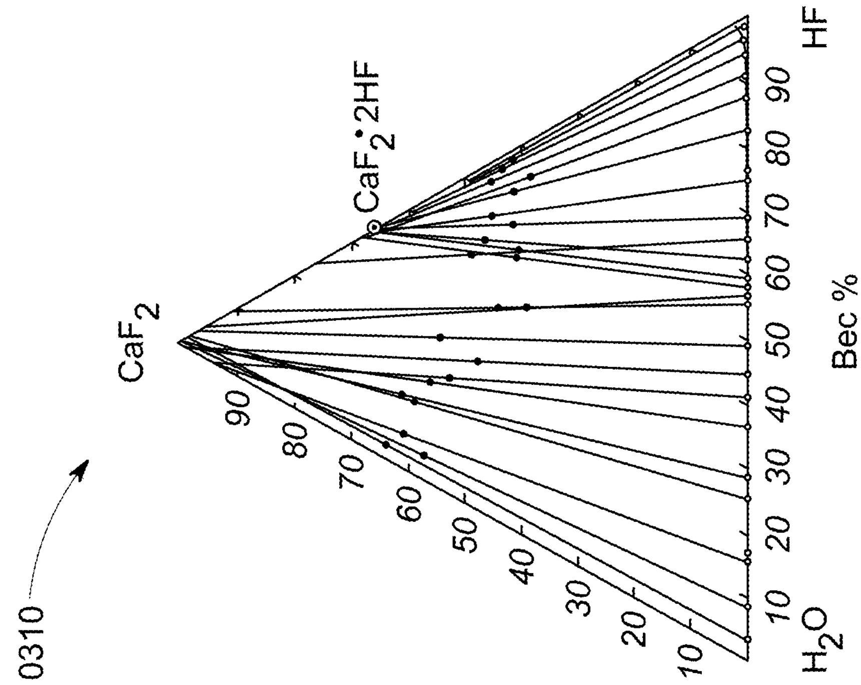

In some cases, the nonlinearity may function in the opposite direction. FIG. 3 gives solubility data for $CaF_2$—HF—$H_2O$ 0310 and $SrF_2$—HF—$H_2O$ 0320 systems presented as ternary diagrams (from Nikolaev, Complex Fluoride Compounds in Binary and Ternary Systems, 1968, hereby incorporated by reference in its entirety). Considering the $SrF_2$—HF—$H_2O$ system for ease of inspection, the data suggest a solubility limit of approximately 18% $SrF_2$ in anhydrous HF. The solubility limit falls to about 0% in a solution of roughly 74% HF and 26% water and remains low in more dilute HF solutions. As a nonlimiting example, the present invention could be realized with a first solution of just under 50% HF and just under 50% H2O, with the balance representing a negligible amount dissolved $SrF_2$. A second solution could comprise about 82% HF and 18% dissolved $SrF_2$. Mixing roughly equal parts of these solutions will cause a greatly supersaturaturated solution and, therefore, crystallization of $SrF_2$. One skilled in the art will recognize that the compositions of these fluids are for illustration and will accordingly understand how to use similar data to design fluids that function analogously for this and other materials. Furthermore, this example shows that the nominal solvent can have a range of compositions, even including those that, nominally, may be better described as an HF system instead of an aqueous or other solvent system.

In other aspects of the invention, the achievable driving force, or degree of supersaturation, may be increased by incorporating an auxiliary acid in at least one of the fluids for material deposition. As an example auxiliary acid, HCl, as a strong acid in dilute solutions, fully dissociates according to:

$$HCl \rightarrow H^+ + Cl^-. \quad \text{(Eq. 6)}$$

In accordance with Le Chatelier's Principle, adding HCl to a system represented by Eq. 1 shifts the equation to the right (favoring more dissolved $CaF_2$) because a fraction of the $H^+$ provided by the HCl combines with $F^-$ ions from the $CaF_2$, consuming a product of Eq. 1, by the reverse reaction of Eq. 3. Curve 0120 in FIG. 1 illustrates this effect, wherein the solubility limit of $CaF_2$ is plotted as a function of HCl added to a $CaF_2$—HCl—HF—$H_2O$ system and where the only HF present forms via the reverse of Eq. 3.

Accordingly, curve 0130 in FIG. 1 plots the solubility limit of $CaF_2$ versus the amount of HF in an aqueous solution, in which a constant amount of HCl (0.1 m) has been added. In comparison to the left side of curve 0110, this clearly increases the amount of $CaF_2$ that can be dissolved in the solvent when little HF has been added, but does not greatly impact the degree of solubility when the level of HF is increased near the right side of the plot. Thus, the overall scale of the nonlinearity is increased, and may benefit the process, at least through one of an increased driving force or increased amount of material deposited per unit volume of a fluid consumed.

In other cases, ion activity may provide the required nonlinearity. As previously noted, Eqs. 2 and 4 are representative of the behavior of dilute solutions. In solutions of intermediate ionic strength, or that may have many species in solution, the aqueous species interact with each other. Accordingly, these solubility relationships are often modified with activity terms that, when multiplied by the actual concentrations, provide effective concentrations that more closely represent the actual behavior of the solution. Using this view here, one skilled in the art will recognize how manipulating the total ionic strength and specific ion activity values can enable at least two fluids that are subsaturated that form a supersaturated mixture. Further, one will recognize that alternate frameworks can be used to predict solution behavior, including but not limited to specific ion interaction theory or Pitzer methods, for the purpose of identifying candidate solutions.

A skilled practitioner will understand solubility models are approximations of complex real-world interactions and, in some cases, that it may be necessary to empirically determine the solubility of an ionic compound in a solvent to realize the present invention. This may be particularly necessary in situations where the solvent system features certain complicating factors, including high ionic strength from an acidic species or feedstock, and may need to be performed in a range of solution compositions. One skilled in the art will recognize how to collect these data by a number of means, including by a straightforward gravimetric analysis or with more advanced measurement of solution composition using any of the instruments described elsewhere for fluid analysis in this description.

Materials

One skilled in the art will recognize how this approach can be adapted to fabricating components from many other ionic materials without departing from the spirit of this description. While the following paragraphs provide specific compositions, the invention is broadly adaptable to any material for which the requisite deposition behavior may be achieved.

Metal halides are a focus of this invention, where the halide component may be ions of fluorine, chlorine, bromine, and iodine, as nonlimiting examples drawn from IUPAC group 17 elements. In certain cases, a corresponding hydrohalic acid (HF, HCl, HBr, HI) of the feedstock cation may be used to control the solubility of the feedstock in a fluid or fluid mixture.

The metallic element of a metal halide may be any metal or metalloid. In particular, it may be a group 1 metal, including lithium, sodium, potassium, rubidium, or cesium. Likewise, the metal may be from group two, including beryllium, magnesium, calcium, strontium, or barium. Other desirable materials may incorporate zirconium, aluminum, lanthanum, hafnium, yttrium, thallium, thorium, and titanium as nonlimiting examples and stress that other fluorides are known, useful particularly in optics, and are compatible with the present invention.

Deposition of metal chalcogenides, including those comprising oxygen, sulfur, selenium, and tellurium as nonlimiting examples drawn from IUPAC group 16 elements, is also compatible with the present invention. Again, the metal can be any metal or metalloid. In some cases, the metal chalcogenide may be zinc sulfide or zinc selenide.

To ensure the purity of the deposited material in critical applications, it may be desirable to limit or avoid species in the fluids that are not present in the nominal composition of the deposited material. As such, a traditional, precipitation-type chemical reaction may be undesirable in these cases. As a nonlimiting example, a first solution of NaF in $H_2O$ and a second solution of CaCl in $H_2O$ can readily be designed to deposit $CaF_2$ upon mixing; however, a non-zero amount of CaCl and NaCl may contaminate the desired product in this case. Accordingly, it may be beneficial to limit the nominal species in a fluid to an ionic material, the conjugate acid of the anion comprising the ionic material, and complexes thereof. In cases where an auxiliary acid is used, the acid chosen may be selected such that the solubility limits of any undesired compounds that may also form are high as compared to the feedstock. One skilled in the art will understand that this is paragraph is not intended to preclude the use of precipitation-type reactions, or reactions that may be interpreted as such, in fluid selection for use with other aspects of the invention, but rather to clarify how the invention may operate for deposition of high-purity materials.

Alternatively, it may be desirable in some cases to deposit a blend of materials. As a nonlimiting example, one skilled in the art will recognize how to design fluids for deposition of magnesium fluoride and calcium fluoride in a desirable proportion in view of this description by controlling their concentrations in view of their respective solubility limits.

In most cases, it is desirable to maintain an acidic environment to mitigate or prevent contamination of the deposited material by metal hydroxides. One skilled in the art will recognize how to design fluids that lower the degree of hydroxide contamination to a specific degree, which may include choosing the fluids to have low, or acidic, pH.

Nonetheless, in some cases it may be advantageous to use a fluid nominally containing a dissolved metal hydroxide, or equivalently containing at least ionized metal and hydroxl ions, at a basic pH. This may enable components to be fabricated of the metal hydroxide, or to benefit deposition in cases where contamination with a metal hydroxide is tolerable or desirable to create a blended material. Such materials may include oxides, such as but not limited to aluminum oxide and magnesium oxide. Deposition may resemble a precipitation reaction or acid-base neutralization reaction in this regime. Moreover, one skilled in the art will recognize how to operate this process for including a degree of metal hydroxide deposition to generate compositional or refractive gradients as provided for elsewhere in this description.

In some cases, an ionic component of the print material may comprise a polyatomic ion. One skilled in the art will recognize how to use the present inventions with different acids to deposit these materials. As a nonlimiting example, calcium carbonate ($CaCO_3$) is a common optical material for polarization-sensitive optics. The solubility of this material can be manipulated using a corresponding acid, or $H_2CO_3$ (carbonic acid) in this case, in a fluid for high purity, or with an auxiliary acid to increase driving force. Printing phosphates and nitrates is possible by using phosphoric or nitric acid in at least one fluid or fluid mixture to control solubility, respectively, as nonlimiting examples.

Other Aspects of Fluid Design

In some cases, grain boundaries may form in the deposited material. This may especially arise when deposition rate is relatively high and, in many applications, the presence of grain boundaries is a defect. One skilled in the art will recognize how to decrease the driving force, or volumetric build rate, by a number of means provided for herein to reduce the likelihood of grain boundary formation. This includes, but is not limited to, changing the relative rates of fluid flow into the mixing zone or changing the composition of at least one of the fluids used.

In certain embodiments, factors other than an achievable supersaturation may inform the nominal composition of the fluids. Specifically, for ease of preparation, fluids may have compositions that reflect energetically favorable operating points for separation unit operations in fluid generation, conditioning, or recycling subsystems. As nonlimiting examples, a fluid may lie near or at an azeotrope for a distillation process or a eutectic point for a fractional freezing process.

In some cases, the fluids may be subsaturated with the ionic feedstock. Such subsaturation may be desirable for any purpose, including control of deposition rate or preventing unintended crystallization at any point in the machine. In some cases, this may be achieved by allowing a solution to equilibrate (become saturated) or approximately equilibrate at one temperature in one portion of the machine, then changing its temperature before flowing to downstream portions of the apparatus. The temperature change may be caused via heat exchanger, heater, or chiller machine components.

In some cases, more than two fluids may be used. Sometimes, this may be used to influence the deposition of a single material, including but not limited to increasing the build rate, resolution, or material quality. In other instances, multiple fluids enable multi-material deposition. Multi-material deposition may be discrete, where a single material is deposited within a specified volume of the part, or may be a gradient in which the composition is a blend of multiple materials, which may change with position. Either may be achieved in any number of ways, including but not limited to changing the fluid supplied to the printhead. This change may be a function of time or degree of completion of the part-in-progress. Alternatively, the composition of a fluid supplied to the printhead may be changed as a function of the specific location within the part-in-progress. Further still, the additional fluid may be delivered by a different flow channel, or even a different printhead entirely. In some cases, the maximum spatial rate of change of the composition of the printed component may depend on the resolution achievable in a single material.

In some cases, a fluid may be used to incorporate a dopant element or compound in the completed part. The degree of doping may be spatially controlled. Doping may be performed by adding the dopant to fluids used in the printing process, or to an auxiliary fluid introduced for this purpose. Alternatively, a fluid with the dopant may be dispensed from a dedicated flow channel in the printhead. To prevent the dopant from being deposited in undesirable locations, the fluid conditioning and recycling steps described elsewhere in this document may be adapted to, or feature unit operations specifically for, removing the dopant from the conditioned or recycled fluid. The dopant may be an ion, electrically neutral atom, or chemical compound, or particle thereof. Exemplary applications of doped optics are provided for elsewhere in this disclosure.

While aqueous, or water-containing solutions, are primarily described herein, one skilled in the art will recognize how other solvents may be used with the present invention. It should be noted that, as a general trend, ionic feedstocks tend to be soluble in polar solvents. In some cases, the solvent may be nonprotic, including ammonia and acetone, as nonlimiting examples. Protic solvents are also possible, including methanol, ethanol, and acetic acid, again as nonlimiting examples. One skilled in the art will understand how to pick the solvent and solute concentrations to ensure sufficient crystallization driving force in accordance with the present description and to mitigate contamination of the deposited material.

In some embodiments of the invention, at least one of the fluids may comprise a solvent immiscible in at least one other fluid. The solvent may be chosen for chemical compatibility with the chemical species dissolved therein, or with any other fluid. The solvent may comprise carbon in addition to fluorine, chlorine, bromine, or iodine. It may be a saturated carbon fluoride, chloride, bromide, or iodide. The immiscible solvent may alternatively be chosen to benefit a fluid recycling process as provided for herein.

The invention may be performed under temperatures or pressures that differ from those accepted as typical room or laboratory conditions. Altering the temperature of the process influences solubility of the feedstock, among other properties of the solutions employed. In some cases, it may be beneficial to use higher temperatures; for example, a greater amount of feedstock may be dissolved in some fluids at a higher temperature if it features conventional solubility. As a counterexample, feedstocks that demonstrate retrograde solubility may be designed to have greater driving force at lower temperatures in some cases. The effect of pressure may likewise be adapted to benefit the process. In some cases, this may directly affect the solubility of the feedstock or other aspect of the solutions. As a nonlimiting example, pressure may be required to maintain a chemical species in solution. In some cases, this may relate to prior examples of materials detailed herein, where $H_2S$, HF, and $H_2CO_3$ and their resulting species in solution, may require printing under elevated pressure to retain them in a solution at a desired concentration and temperature.

One skilled in the art will recognize that the state of the solution is dependent on the combination of temperature and pressure. Thus, while solutions are typically described as liquids herein, the invention is fully compatible with supercritical fluids. Here, a supercritical fluid is taken to be a fluid at a temperature and pressure that exceed the critical point, beyond which the gaseous and liquid thermodynamic phases are no longer distinct.

Printhead

Figure 4:
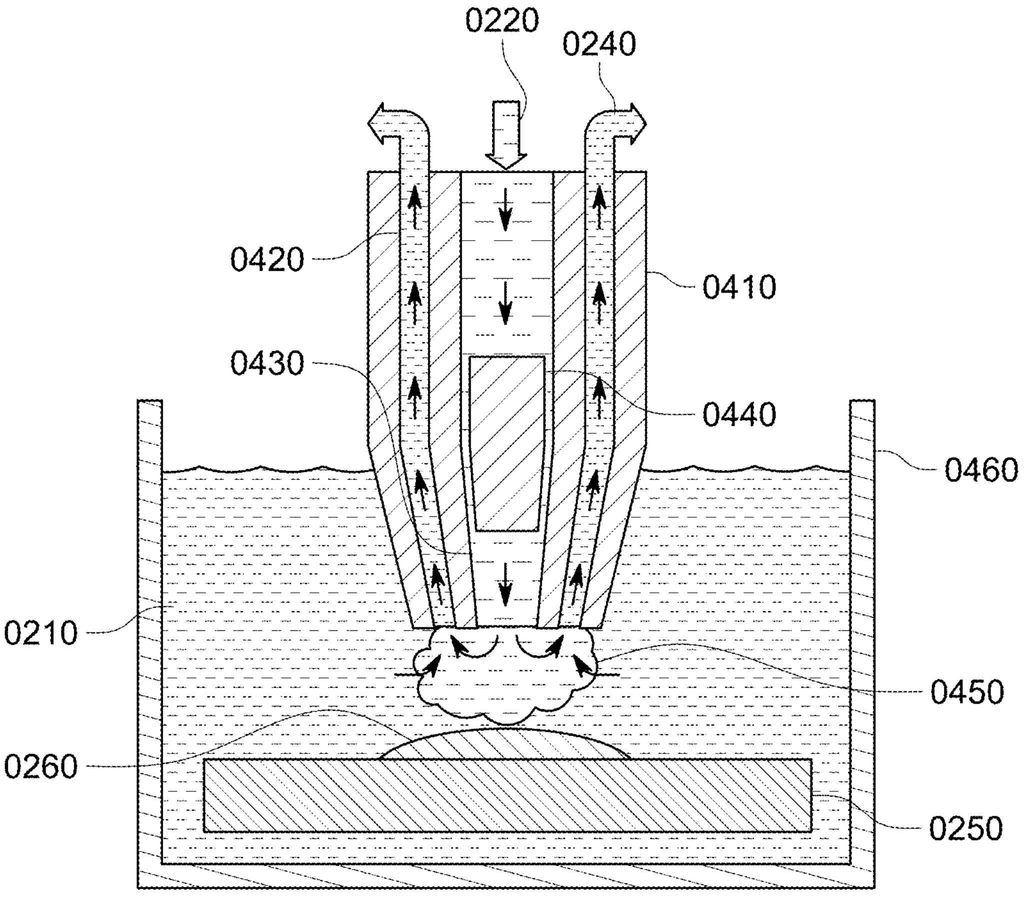
FIG. 4 is a cross-sectional schematic of a printhead, including indication of fluid flows.

Fluids, with compositions determined per the above developments, may be used in conjunction with a printhead to spatially control where deposition occurs on a substrate; an exemplary embodiment is shown in FIG. 4. Therein, a substrate 0250 is immersed in a first fluid 0210, which forms a saturated bath; for example, the substrate may be a crystal of calcium fluoride (CaF2) and the bath may be a dilute solution aqueous hydrogen fluoride (HF) which is saturated with $CaF_2$. A printhead 0410 is used to dispense a second fluid 0220, through a central, circular flow channel 0430. The flow rate of the second fluid is controlled by a valve 0440. After a volume of the second fluid is dispensed, a mixing zone 0450 is formed, which is supersaturated with feedstock. A portion of the supersaturated feedstock forms deposited material 0260 on the substrate. An effluent stream 0240 is drawn through an annular channel 0430 to prevent mixed fluid from changing the composition of the first fluid outside of the mixing zone.

Figure 5:
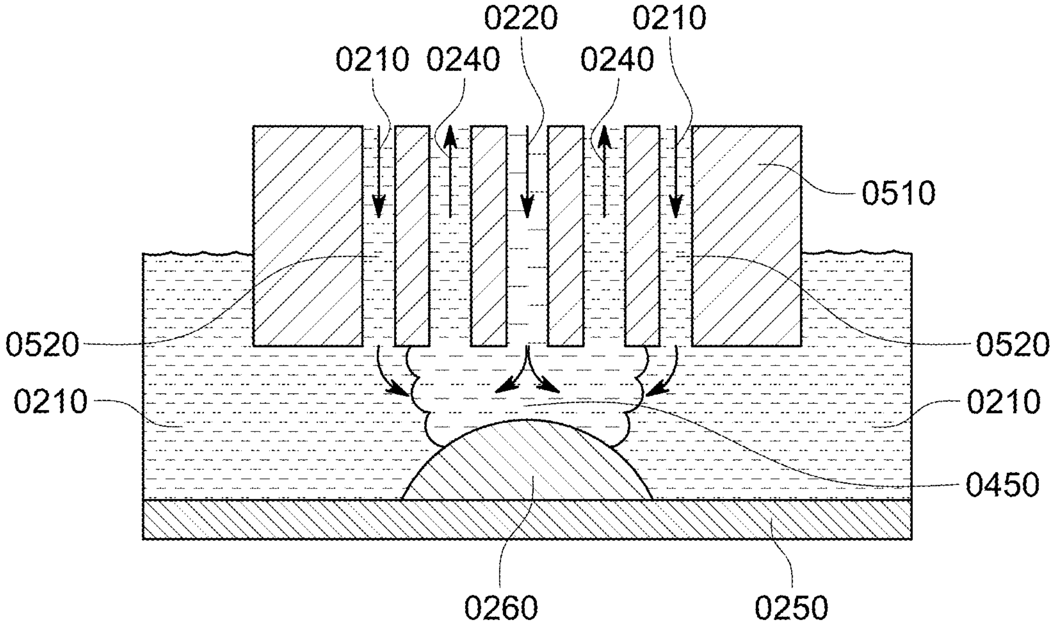
FIG. 5 is a cross-sectional schematic of a printhead with two input fluid flows and one output fluid flow.

Any number of fluid flows may pass through the printhead for any purpose. FIG. 5 depicts an exemplary printhead 0510 which, as compared to 0410, features a third flow channel 0520 of annular shape. Any fluid that may benefit the process may be supplied by the extra flow channel. Here, the first fluid 0210 is supplied via the extra flow channel for the purpose of changing the fluid flow around, and therefore the shape of, the mixing region. The rate of such a fluid flow can be used to alter the resolution of the deposition process.

In general, the precision of fluid control in and around the mixing zone may be influenced through the size of the flow paths. Thus, while flow channels can be of any size, in cases demanding high resolution in material deposition may require small flow channels. The dimensions of a flow channel are generally limited only by the manufacturing process used to create them. Representative, nonlimiting microfabrication techniques include etching, focused ion beam milling, laser ablation, and other similar techniques that may produce flow channels with nanometer or micron dimensions, or larger. Larger flow channels may be more optimally manufactured by conventional manufacturing operations, including milling, drilling, griding, casting, and forming as non-limiting examples.

Flow of at least one fluid through a flow channel in a printhead may be controlled to be constant, variable, or pulsed. In some instances, the flow may be controlled directly by altering the speed of or pressure generated by a pump that supplies at least one fluid to the print head. Additionally, or alternatively, a valve may be used to throttle the fluid flow. The valve may be integral to printhead structure, integral to a flow channel, or placed farther upstream (e.g., between the pump and printhead). The valve may be actuated via motor, piezoelectric actuator, thermal actuator, electrical solenoid, or any other known means. The valve may resemble an inkjet nozzle in operation in some embodiments. Flow rates may be controlled independently for each flow channel.

Requisite control of fluid volumes and flow rates will scale with flow channel dimensions, or desired process resolution, in most cases. As an example, the volume of 1 picoliter has a volume equivalent to a cube 10 microns on a side. As such, means for fluid metering on the femptoliter or picoliter scale may be indicated where fine resolution is required, and one skilled in the art will recognize that fluids are often delivered at these scales in many other applications.

The size of a flow channel should not be confused with the resolution achievable with the present printing process. Resolution achievable in the direction orthogonal to the substrate surface is largely determined by how precisely the driving force and residence time are controlled. Nonetheless, one skilled in the art will recognize that atomic-scale surface finishes lie within the realm of traditional liquid phase epitaxial processes and that such resolution may achieved with the present invention. Resolution achievable in the other two translational dimensions is strongly influenced by the dimensions of the mixing zone and, more particularly, dimensions where the mixing zone is in contact with the substrate. It follows that the spatial resolution in these dimensions may be larger or smaller than a nominal flow channel dimension. Using aspects of the invention as provided for herein, particularly in delivering a fluid from the printhead for the purpose of manipulating the size of the mixing zone, that this region may be arbitrarily small, or at least enables deposition at the scale of hundreds of nanometers, tens of nanometers, nanometers, angstroms, or smaller.

The flow rates may be determined to influence attributes of the mixing zone. Fluid residence time in the mixing zone can be estimated from mixing zone dimensions and fluid velocity, and controlled by changing at least one of these parameters. One skilled in the art will understand that longer residence times may result in more fluid-efficient deposition (that is, more complete depletion of supersaturated material from the mixing zone), and that shorter residence times may be more time-efficient or provide for different resolution or quality of the component. Particularly in cases where the printhead supplies at least two fluids to the mixing zone, the volumetric flow rate of each stream may be determined as to achieve a nominal ratio of the fluids in the mixing zone. This may be necessary at least to achieve a targeted degree of supersaturation as provided for herein. Flow rates may also be used to manipulate the dimensions of the mixing zone, again to the extent that supersaturation is still achieved in the mixing zone.

Attributes of the mixing zone are also influenced by the standoff or separation distance between the flow channels in the printhead and the substrate upon which deposition occurs. These attributes may include the size of the mixing zone, or spatial gradient of supersaturation achieved therein. In some cases, this may be controlled via feedforward means, such as from knowledge of volumetric build rate and spontaneous dissolution rate, and encoded as part of the recipe. High resolution deposition may require this distance to be measured and the process adapted in response. Response measures may include changing the separation distance in view of the measurement or, alternatively, changing a flow rate or flow duration to adjust the size of the mixing zone, or changing a flow rate or flow duration to change the deposition rate, as nonlimiting examples of process adjustments that may be performed in view of separation distance measurement. The distance measurement may be performed by any means known in the art, including optically, via interferometry, acoustically, or via tactile (contact) sensor.

Figure 6:
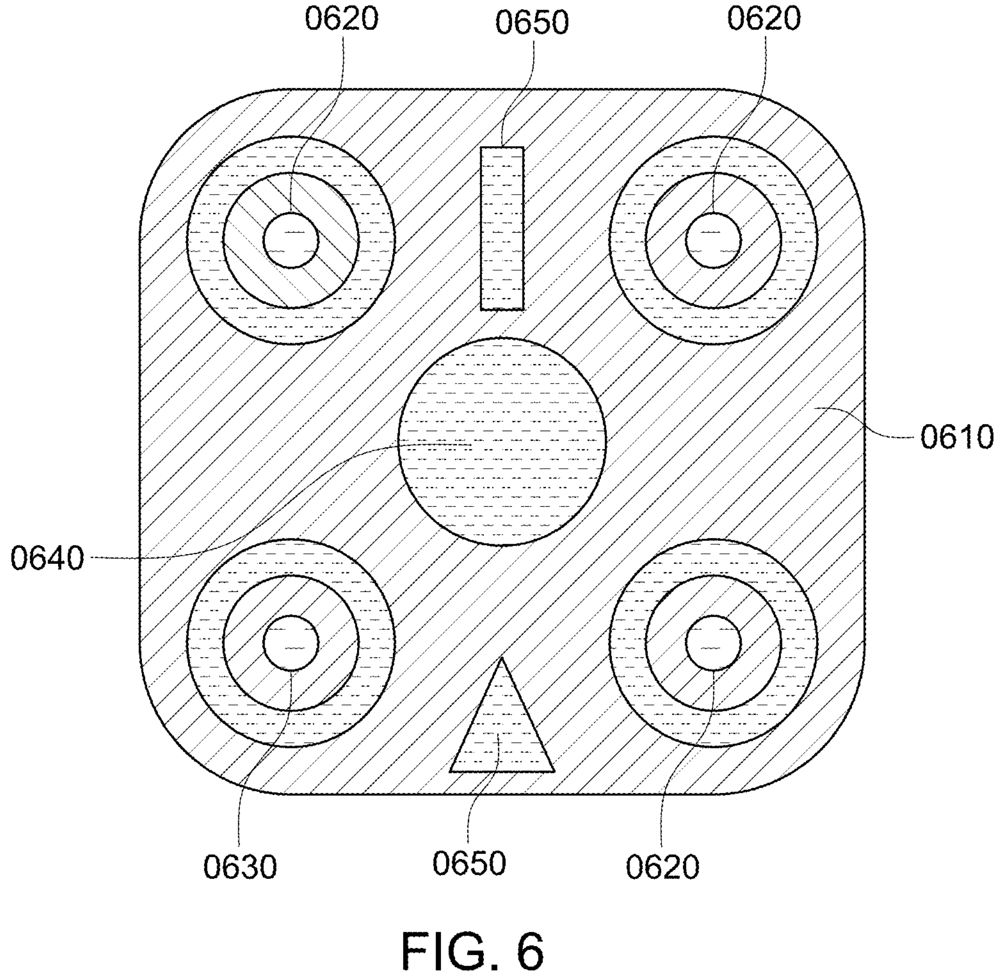
FIG. 6 is a view of the substrate-facing side of a printhead, illustrating a range of flow channel shapes and flow channel functions.

In some cases, the printhead may have a plurality of flow paths that may operate independently. FIG. 6 illustrates the bottom surface of a printhead 0610 comprising many flow channels for nonlimiting illustration purposes. Flow channels may be disposed in a linear, rectangular, or hexagonal array, or in any other configuration. For example, each of 0620 and 0630 comprises a central flow channel and an annular flow channel. In some cases, the flow channels may be different sizes. The portion indicated 0640 is a singular large flow channel. Such a flow channel to dispense a fluid resembling the saturated bath, disposed within an array of flow channels intended for deposition, may help prevent starvation of this fluid near the center of the printhead. As illustrated here, all of 0620, 0630, and 0640 are positioned on a close-packed rectangular array. Also in this example, flow channels 0650 show that flow channels need not be identical in shape. Likewise, flow channels may function to deposit different ionic materials. Here, the three channels indicated 0630 are configured to deposit a different material than those indicated 0620. Further, a plurality of flow channels may be supplied in parallel from, or converge in parallel to, a common conduit leading to other machine subsystems provided for herein.

In many embodiments, it is necessary to provide means for moving the printhead relative to the part in at least one direction, dimension, or rotation. As a nonlimiting example, this may be necessary to address an area larger than the printhead itself, or to print features smaller than the delivery-flow-channel-to-delivery-flow-channel spacing if using a printhead with a plurality of flow channels for delivering at least one fluid causing material deposition. This relative motion may be caused by moving the printhead, the part-in-progress, or both, along at least one motion axis. One skilled in the art will recognize that printhead trajectory need not be planar (i.e., printhead motions restricted to rectilinear motion). One skilled in the art will recognize that a range of motion systems are possible, but all adjust the spatial position in three orthogonal directions (which may be referred to as, X, Y, Z, where traditionally X and Y may lie in a plane of a flat surface of surface of a substrate, or tangent to a curved surface of a substrate, and Z is the build direction and normal to the X-Y plane) and three rotations about at least two of the three orthogonal directions (roll, pitch, and yaw, among other names and conventions). Complex motions enable out of plane (out of X-Y plane) printing. Thus, deposition need not necessarily proceed in a layer-by-layer or cross-section-by-cross-section manner. In some cases, it may be beneficial to define printhead trajectories that maintain an approximately normal orientation of the printhead to the area on the part-in-progress being addressed. Deposition also may be performed with the printhead skewed from a normal orientation to the substrate surface where deposition occurs, including but not limited to where geometrically sharp features are to be created. As such, the motion system of the printhead may have motion axes configured for providing relative rotation of the printhead to the part-in-progress. One skilled in the art will be familiar with a range of motion system designs, including but not limited to those characteristic of machine tools like milling machines.

In general, the range of this relative motion will determine the maximum dimensions of a part to be printed. Similarly, the accuracy and precision of these motions will impact the quality of the finished part. Both of these aspects drive the cost and complexity of the motion system and, in turn, the cost of a finished part. Thus, one skilled in the art will recognize that a range of part sizes and qualities may be desirable, and the dimensions or resolutions described in any exemplary embodiment or part fabricated therewith are not intended to bound the invention. Because the parts printed with the present invention are free from thermally-induced residual stress, one skilled in the art will recognize that larger components may be fabricated than is possible using conventionally grown (e.g., by melting or chemical vapor deposition) material. Specialty motion measurement and control hardware may be necessary to preserve the precision of material deposition over long distances; this may include, as a nonlimiting example, systems similar to the laser interferometer instruments that provide for tracking of toolpath trajectory to nanometer precision in diamond turning equipment.

In certain aspects of the invention, a flow channel may comprise engineered microfluidic structures. In some cases, these structures may provide for delivering at least two fluids in the same flow channel. The flow of a first fluid in the channel may be in the form of discrete droplets or in the form of a stable co-flow. While a degree of premature mixing is likely, the bulk of the mixing may be engineered to occur when the composite flow impinges upon the substrate at a location where deposition is desired.

Figure 7:
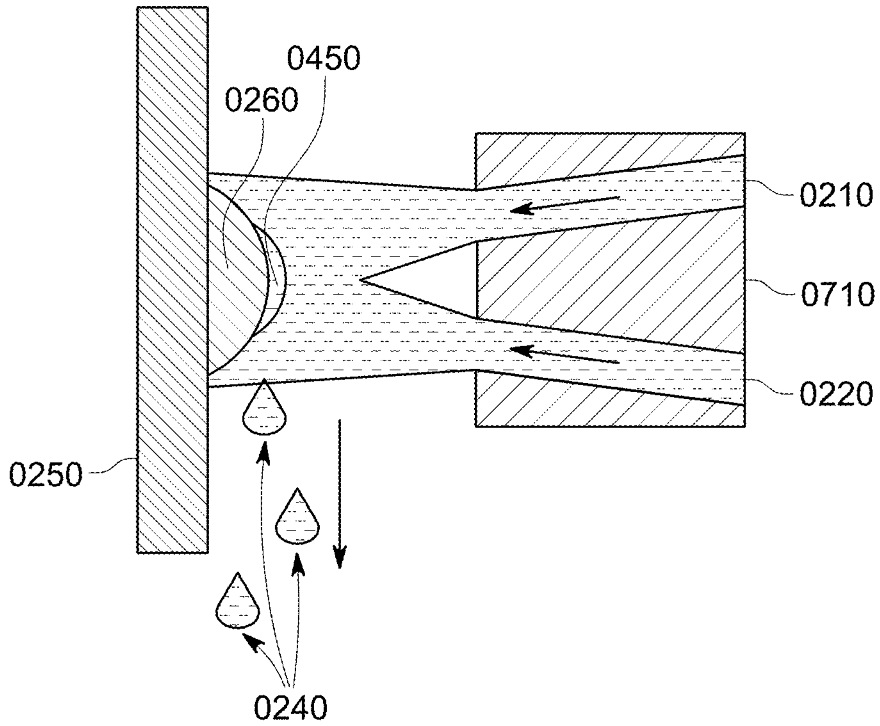
FIG. 7 is a cross-sectional schematic of a printhead configured to spray two fluids onto a substrate, resulting in material deposition.

In some cases, the at least two fluids may be delivered using a printhead 0710 configured to spray the fluids onto the part surface, as shown via the exemplary embodiment of FIG. 7. Such an implementation does not rely on the part-in-progress to be at least partially submerged in one of the fluids. In some cases, as opposed to liquid streams, the fluids may be aerosolized or atomized liquid droplets in a gas stream. The streams may be delivered from different flow channels in the same printhead, or by different printheads. Formation of a mixing zone 0450 may occur prior to the fluid sprays contacting the substrate 0250, or result from mixing once the fluids impinge on the substrate. In either case, material 0260 is deposited from the supersaturated mixing zone. The effluent 0240 may run off the substrate by gravity, or removed by the action of a flushing flow, airflow, wiper, or any other means for controlling fluid motion known in the art. The effluent may be recycled as provided for elsewhere in this disclosure.

In some cases, it may be necessary to design a printhead using materials inert to the chemical species present. In the case of HF, as a nonlimiting example, it may be desirable to use noble metal or fluoropolymers for machine elements, including but not limited to gold, platinum, palladium and polytetrafluorethylene, in machine components and subsystems that contact the fluids employed. In some cases, an alternate material may be used and coated with a noble metal or polymer to impart the requisite chemical resistance.

Machine Design

In some aspects of the invention, it may be beneficial to use a plurality of printheads, either simultaneously or sequentially. This may improve process speed through addressing a larger fraction of the area of the partially-printed component. Printheads may be similar, or may have contrasting attributes. As such, they may be configured to deliver different solutions, or feature different diameter nozzles, as nonlimiting examples. In some cases, the printheads may be configured to address the same surface or different surfaces of the same in-process component. The motion and deposition of the printheads may be synchronized, and even deposit material simultaneously, as coordinated by the recipe and controller.

In some embodiments, a printhead subsystem may be interchangeable. The printhead may comprise mechanical alignment features, fluid connections, or electrical connections to facilitate removal and installation within the printer. It may be desirable to interchange the printhead for any reason. In some cases, it may be necessary to replace the printhead due to wear or corrosion. Likewise, changing a printhead may facilitate changing materials, build rates, resolutions, or other attributes of printhead performance as nonlimiting examples.

Specification of a component to be printed may be communicated to the printer by way of a recipe. The recipe may define, by way of independent and nonlimiting examples, the geometry of a component to be fabricated, printhead trajectory, and commands to actuate the nozzle or nozzles in the printhead. Other aspects of the recipe may include temperatures, flow rates, or compositions of the various fluids employed in the printing process. Further, these parameters may be changed during the course of fabricating a component. As a nonlimiting example, parameters for rapid deposition may be used to create the bulk of a part, and parameters for precise deposition and smooth surface finish may be used on finishing passes of the printhead. Still further, the recipe may define local changes in material composition. The recipe may be defined or communicated as a binary file. A practitioner skilled in the art will understand how a recipe may incorporate machine instructions to perform other functions defined or derivable from the present disclosure.

Figure 8:
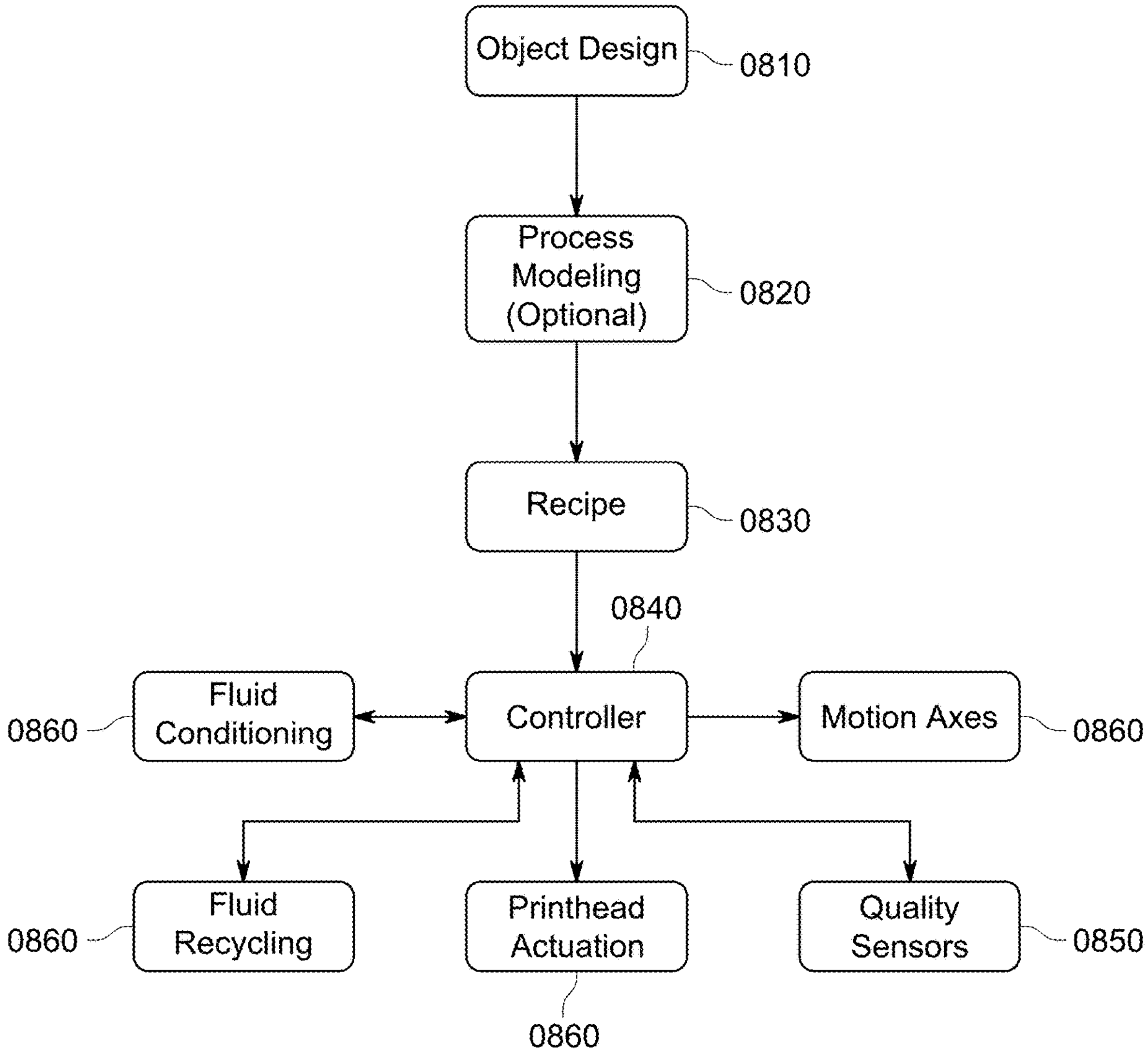
FIG. 8 is a flowchart illustrating the information flow in the printing process.

In many practical embodiments of the invention, it is necessary to incorporate a controller to direct, measure, and correct many aspects of machine function. FIG. 8 generally represents informational flows that may pass through the controller 0840 in printing an exemplary part. The controller may be or comprise a CPU, GPU, FPGA, ASIC, microcontroller, digital signal processor, system on a chip, system on module, or PID controller as nonlimiting examples. The controller may be configured to perform at least one of receiving a recipe 0830, receiving measurements 0850, or providing control signals to machine elements 0860.

A recipe 0830 is generated for a part or collection of parts to be printed simultaneously, defining the machine operations necessary to manufacture them, which may incorporate aspects of a desired shape, composition, or quality of the component. It may further comprise machine commands, including printhead motion commands, printhead dispensing commands, or commands to any machine subsystem.

Generation of the recipe may involve the step of process modeling, depicted as element 0820 in FIG. 8. This process may be performed by the controller, or by a computational device operating on a recipe before it is deployed to a machine. Further, process modeling may be performed in view of a desired component, as to ensure its geometric or compositional fidelity. One skilled in the art will recognize that such an approach may benefit the process in a number of ways, jointly or independently. At a simplistic level, this modeling may compensate for systematic errors in printhead trajectory, flow channel flow rate, or other known, measurable, or estimable deviations from nominal machine performance. More complex compensations are also possible. For example, a degree of spontaneous material dissolution and deposition may occur on surfaces immersed in one of the fluids. The rate of this processes may be further affected by attributes of the surrounding fluid. One skilled in the art will recognize how to adapt the recipe to compensate for geometric errors arising from this process, or estimate changes in surface roughness as a function of time, especially those that may require remediation or reprocessing prior to part completion.

Process instruments may relay signals to the controller. The controller may record the signals for quality control. The recorded signals may be analyzed during the printing process, or stored for post-print analysis. The controller may also perform actions in view of these signals.

In other aspects of the invention, various machine parameters may be instrumented. Attributes of the various fluids may be monitored, including but not limited to temperature, pressure, vapor pressure, conductivity, impedance, potential, pH, ion concentration, turbidity, particulates, flow rate, liquid level, volume, and density. The supply of feedstock reserves may be monitored. Position of motion axes may also be recorded. Offset between printhead and part-in-progress may be measured. One skilled in the art will recognize a diverse range of instruments and techniques for performing these measurements.

Nonetheless, certain techniques are well-suited to measuring the concentrations of species in fluids as described herein. Spectroscopy may be used to measure absorption or emission (e.g., Raman) features that are correlated to the concentration of at least one species. Measurement of $H^+$ concentration (pH) may be performed with an indicator that changes color or another optical property in response to pH. The indicator may be used in conjunction with a titration process. Alternatively, pH may be sensed with a pH meter; further, that meter may function using a glass electrode as an ion-selective electrode in conjunction with a reference electrode as a nonlimiting example. Concentrations of other ions may be measured analogously, using electrodes selective thereto. Electrical properties, including resistance may also indicate fluid composition. Electrochemical impedance spectroscopy is another representative technique for measuring fluid attributes, and provides a more complete understanding of fluid composition than DC electrical measurements. Chromatography and mass spectroscopy are further nonlimiting examples of methods for determining the actual composition of a fluid. Gravimetric techniques can also be used in many ways in conjunction with the invention as to deduce fluid composition, including by determining how much of a species can be dissolved in a representative volume of the fluid or how much of a species can be precipitated from a representative volume.

The machine may feature many other machine elements configured to perform a range of fluid conditioning operations. Machine elements may include heat exchangers, pressurizers, settling tanks, filters, pumps, tube-in-tube plumbing for temperature control, water jackets, circulators, impellers, and other devices known to one skilled in the art for performing a unit operation on, or controlling the attributes of, a fluid. The controller may actuate machine functions in view of instrument signals. Machine functions may include operating valves, pumps, heaters, or other means to implement the invention disclosed herein. In some cases, a subsystem or machine may operate under a controlled atmosphere. The atmosphere may be pressurized beyond atmospheric pressure. The atmosphere may incorporate gasses to be dissolved into a fluid. Alternatively, the atmosphere may be designed to be inert or insoluble in a fluid.

Figure 9:
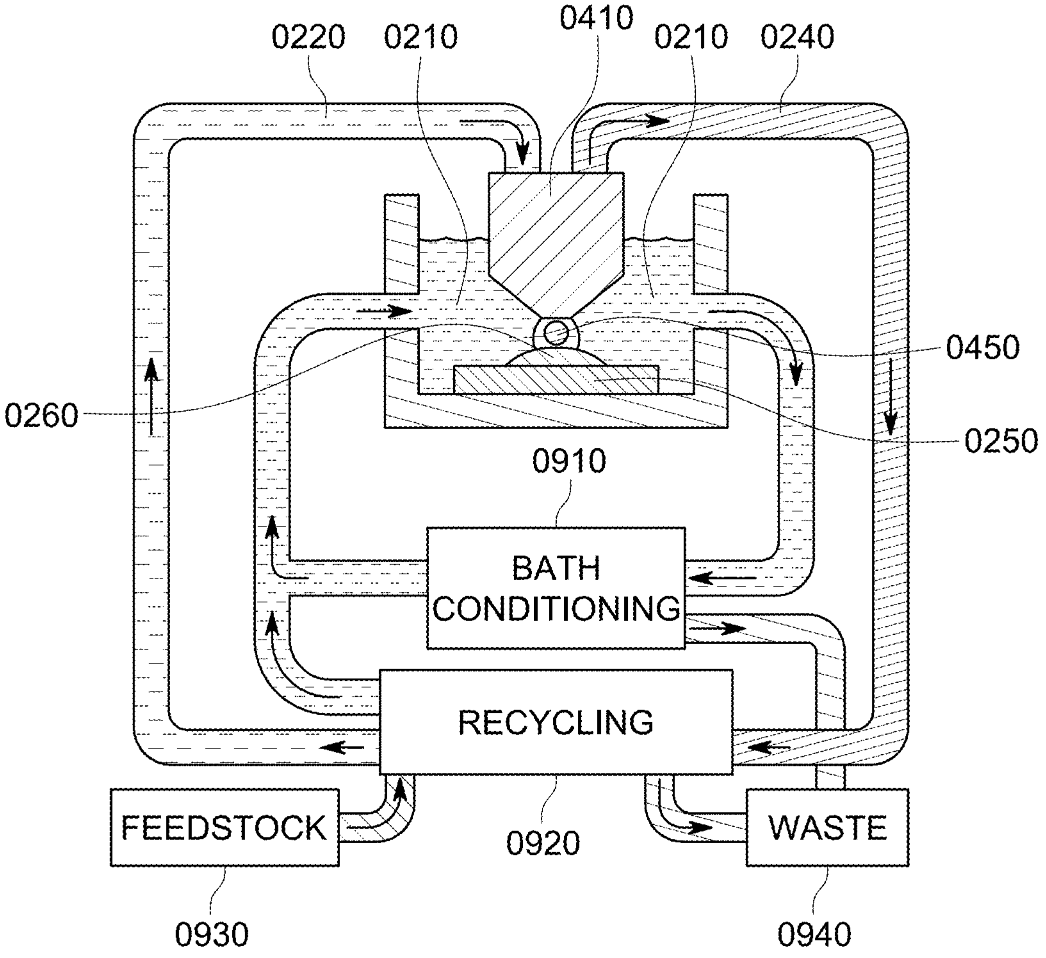
FIG. 9 is a representation of fluid flows in a printer, including effluent recycling and bath conditioning subsystems.

In some aspects of the invention, machine elements may enable at least one fluid may be recycled or reconditioned. For example, FIG. 9 shows how at least one fluid, which may be effluent stream from the printhead, may be recycled in a recycling subsystem 0920. The output of the recycling system may be any fluid. Here, the recycling system is configured to generate a first fluid 0210 and a second fluid 0220 for consumption by the printer. As part of the recycling system, additional feedstock 0930 may be added to the fluid streams. A waste stream may also be generated, such as contaminants filtered from the effluent stream, and directed towards a waste-handling subsystem 0940.

Recycling may comprise a number of steps, including but not limited to distillation, reverse osmosis, ion exchange, solvent-solvent extraction, chromatography, filtering, fractional crystallization, or any other separation process known to one skilled in the art. It may further comprise addition of chemical species as required to achieve a specified fluid composition. The pressure or temperature of a fluid may also be adjusted as part of recycling. Some separation operations may be designed to specifically target corrosion products resulting from the action of a fluid on machine components. A recycling subsystem may be configured to receive or to generate any number of fluids.

Analogous to recycling is fluid conditioning, depicted as machine element 0910 in FIG. 9. This process is essentially the same as recycling, in that the conditioner may filter, adjust the composition of, or perform any of the other functions of a recycling unit. The only distinction is that a conditioner may draw or direct fluid to any location within the machine and therefore does not necessarily act on an effluent stream. Additionally, or alternatively, a conditioner may prepare fluid streams from fluid components that have not yet passed through the printing system.

Creating, recycling, or conditioning a fluid may require dissolving feedstock or another solid material therein. One skilled in the art will recognize that the speed of which the solid phase comes to equilibrium with the concentration of dissolved species is dependent on a number of factors, including the exposed surface area of the solid phase and nature of fluid flow about it. As such, this step may be achieved or augmented with a range of unit operations, including but not limited to mixing, agitation, ultrasonic mixing, settling, filtering, and other related means.

Further aspects of the invention include aspects of reagent supply, including but not limited to supply of ionic material feedstock and other fluid components. A reagent or feedstock may be input into the machine in any convenient form, including but not limited to as a solid, powder, prills, pellets, solution, or gas. In some cases, the reagents may be precursor compounds that react to form a component of a fluid. If a reagent is supplied as a solution, it may be more, less, or similarly concentrated to the fluid it is used to create. Many reagents may be necessary to complex, multi-component fluids.

The invention may further comprise a disposal system for at least one waste stream. The waste stream may be generated as an outflow from the print area or, alternatively, may be discharged from any fluid conditioning, recycling, or filtering machine element. The disposal system may provide means for pH measurement and neutralization. This machine element may consume an additional reagent to cause a neutralization reaction. Separately, the disposal system may provide for precipitating, flocculating, or filtering at least one chemical or elemental species from the waste stream as a solid.

In additional configurations, the printer may contain machine elements for in-situ measurement of the part-in-progress or fully-fabricated part. As non-liming examples, these machine elements may sense surface profile, surface roughness, local composition, or presence of grain boundaries. These machine elements may embody the operating principles of optical imaging, microscopy, stylus profilometry, atomic force microscopy, laser interferometry, white light interferometry, x-ray imaging, x-ray diffraction, spectroscopy, optical transmission, or optical reflection as nonlimiting exemplary modalities.

In some methods, the printing process may be paused to enable removal of the part-in-progress from the machine for intermediate, ex-situ measurements. Ex-situ measurements may comprise stylus profilometry, atomic force microscopy, laser interferometry, white light interferometry, x-ray imaging, x-ray diffraction, spectroscopy, optical transmission, or optical reflection as nonlimiting exemplary modalities. In some cases, the removal and replacement of the part in progress may be facilitated with alignment features, as enabled elsewhere in this description.

Further still, the controller may take corrective actions based upon received in-situ or ex-situ measurements. Such corrective actions may include, but are not limited to, alteration of a recipe to improve the geometric or compositional fidelity of a part. In some cases, the controller may correct extreme defects in a part-in-progress by material removal followed by localized deposition. In extreme cases, the print may be terminated if a defect in the part-in-progress is deemed sufficiently severe.

Other Aspects of the Invention

The substrate can generally be of any starting shape. In some cases, it may be manufactured by conventional manufacturing processes. It may be polished on one or more faces. It may also have known or measured crystal orientation along at least one axis, which may be oriented with respect to the desired component geometry and or machine motion axes. Further, it may have features to index or visibly indicate the crystal orientation. In some cases, at least one surface of the substrate may be non-planar. The non-planar surface may be generated by grinding, polishing, diamond turning, molding, or any other manufacturing process known to one skilled in the art. In some cases, the substrate may be a different material than the deposited material.

In certain cases, it may be desirable to remove or dissolve material from the substrate. This may be done to for any reason, but may include removal of a support or indexing feature, improvement of a surface finish, remediation of a defect, or improvement of geometric accuracy. Material removal may be performed by supplying at least one fluid with the printhead which causes the mixing zone to become subsaturated with the feedstock material. In some instances, the rate or geometric extent of material removal is controlled by controlling the degree of subsaturation and fluid flow rate. Sufficient description of solubility limits is provided herein for one skilled in the art to design fluids that create a subsaturated mixing zone.

In some cases, it may be necessary to reorient the part-in-progress during the printing process. As a nonlimiting example, the process for fabricating a biconvex lens may begin using a substrate having top and bottom planar sides. First, material is deposited on the top half of the substrate as to form the first optical surface. Next, the substrate is inverted, allowing printing to resume on the bottom half of the substrate as to form the second optical surface of the lens. Alignment features for facilitating reindexing the part, such as kinematic couplings, elastically averaged couplings, pins, holes, slots, and other locating features known to one skilled in the art, may be present on the substrate prior to material deposition or may be printed on the substrate during the fabrication process. In some cases, the features may be used to relocate the part-in-progress in the printer after ex-situ quality inspection. These features may be designed to be easily removable, by fracture, sawing, grinding, or dissolution as exemplary methods, when they are no longer necessary.

In a more complex nonlimiting example of relocation when printing the same biconvex lens, the first optical surface is printed on a first substrate, in addition to alignment features. The part-in-process is then removed from the deposition system, and replaced with a second substrate in the printer. A set of mating mounting features, designed to engage those printed on the first substrate, are then printed on the second substrate. Then, without removing the second substrate from the printer, the first substrate is mated to the second substrate using the printed alignment features on each substrate. Finally, the second optical surface of the biconvex lens is printed on the opposite side of the first substrate. In this manner, the part-in-progress is precisely reoriented within the printing system, limited only by the geometric accuracy of the alignment features and the repeatability of their contact. One skilled in the art will recognize how to predict the precision of this reindexing from the geometric precision possible with the machine, surface roughness, and material properties, among other factors that influence component location, as well as how to design an interface accurate or repeatable to a given metric in view of these parameters.

Printed Components

The inventions disclosed herein are adaptable to any arbitrary geometry that may be desirable to print. Nonetheless, several high-value applications are provided herein, strictly as nonlimiting examples of how the invention may be utilized. Nonlimiting, exemplary applications include optics, lithography, MEMS, microfluidics, and refractory components.

Aspects of this invention specifically target fabrication of optics from metal fluorides. Many metal fluorides are known for their transmission at UV wavelengths; as nonlimiting examples, $CaF_2$ is known to be an effective optical material at wavelengths between about 150 nanometers and about 10 microns. LiF is another known optical material, used between about 120 nanometers and about 6 microns. It follows that optics fabricated with the present invention may find application at practically any optical wavelength.

In some optical applications, the present invention may be used to generate optics with aspheric or freeform surface profiles. As nonlimiting examples, printed surfaces may be incorporate a Fresnel lens, diffraction grating, diffractive beam shaping optic, or hybrid refractive-diffractive lens. The profiles may be continuous, or may feature abrupt discontinuities (e.g., square- or sawtooth-like shapes).

In some optical applications, optics may be designed for operation in at least two spectral bands. At least one spectral band may be at ultraviolet, visible, or infrared wavelengths.

Figure 10:
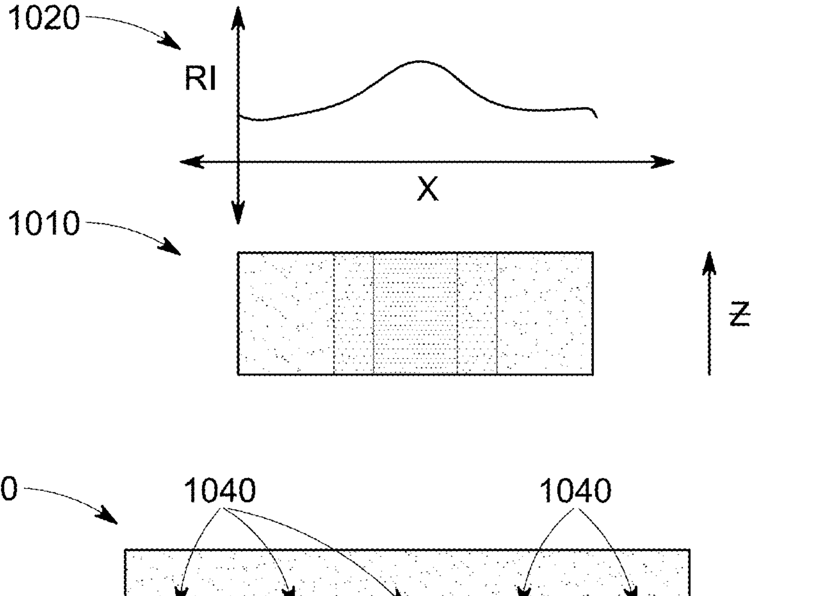
FIG. 10 shows X-Y cross sections of two printed components comprising spatially controlled material composition that alters refractive index.

In some optical applications, embodiments of this invention may be used for fabricating optics with spatially controlled refractive index as shown in cross section in FIG. 10. For example, a component 1010 may function to spatially contain light along a path in the Z direction via total internal reflection, or otherwise form a waveguide, using a spatially-controlled index of reflection 1020. Other exemplary applications include GRIN (Gradient Refractive INdex) optics, where the refractive index gradient is used to control optical aberrations. Alternatively, or in addition, the inventions disclosed herein can be used to create immersion optics. As a nonlimiting example, FIG. 10 also depicts the cross section of an immersion diffraction grating 1030 formed by periodic regions of a material of higher refractive index 1040 embedded in a lower index material.

In other optical applications, components fabricated by this process may be used in photonics or optical computing applications. This may include components for optical logic gates, photonic interconnects, optical modulators, switches, photodetectors, and quantum computing elements.

In alternative optical applications, parts may be doped. Dopant elements can be any element, and doping with chemical compounds is also possible with the present invention. Nevertheless, one skilled in the art will recognize benefits in certain applications from neodymium, erbium, thulium, holmium, ytterbium, and thallium. Doping may impart a nonlinear optical property, such as but not limited to frequency doubling or optical frequency mixing. As such, doping may be useful in printing laser or optical amplifier components, as nonlimiting examples. Doping may also be useful in printing optics for atomic or quantum timekeeping.

In some cases, the printed optic may be designed to be sensitive to or alter the polarization of light passing through it. Such optics may incorporate aspects of polarization gratings, waveplates, polarization sensitive beamsplitters, or other similar polarization-dependent properties. In such cases, it may be necessary to use a substrate with a known or approximately known crystal orientation as to orient the crystal axes with the component features.

In some applications, the printed component may function as a scintillator. The scintillator may be designed for sensitivity to X-rays, gamma rays, particles, or other forms of radiation. The scintillator may also be doped with other elements as provided for elsewhere in this disclosure.

The printed component may be further processed prior to use, including but not limited to coating. Depending on the coating function and composition, it may be applied using the present manufacturing process, as a post-print process, or in alternating fashion using the present process and a second process (e.g., CVD, ALD, sputtering, dip coating, painting, as nonlimiting examples of alternative coating processes). The coating may impart a variety of functions, including but not limited to providing an anti-reflective, reflective, shortpass, longpass, bandpass, matched filter, or other optical character. As such, the coating composition may be any of those recognizable to one skilled in the art as suitable for a specific application. The coating may further comprise a plurality of individual layers of different materials. The coating may also function as a moisture barrier to prevent atmospheric humidity from degrading surfaces of the component. In some cases, the coating is applied using the multi-material functionality of the present invention.

In some cases, the object printed may be utilized as a mask for use in photolithography. Printed features on the mask may alter at least one of the phase and amplitude of an optical wavefront, with or without additional coatings as provided for elsewhere. Features may function as geometric optical features. Alternatively, structures may be diffractive in nature. Further, diffractive structures may be designed using an inverse lithography approach.

The as-printed component may function as a stamp for contact lithography. Stamp features may be on any size scale achievable with the present invention, and they may be small as compared to the feature sizes possible with photolithography (i.e., at the scale of 10s of nanometers or smaller). Contact lithography may be performed in conjunction with a liquid photoresist. Curing of the photoresist may be facilitated by using an ionic material transparent to wavelengths emitted by a light source.

The printed component may be a micro-electromechanical system (MEMS) or a component thereof. The following examples of MEMS are provided for illustration, and are by no means limiting. MEMS sensors may include accelerometers, gyroscopes, pressure sensors, temperature sensors, and biosensors. Alternatively, MEMS structures may also function as actuators, such as microvalves, micromirrors, and microengines. Further still, MEMS structures may feature resonators, such as those used in timing devices and RF filters among other applications, where the resonating element may be a beam, disk, or ring-shape. Cantilevers are similar structures that may also be printed as described herein, and may be used in atomic force microscopy, chemical and biological detection among other applications.

This invention is also suited to fabricating devices for fluid handling, where, for the purpose of this paragraph, the device should be considered as a complete article and the fluid is taken to be any fluid in the conventional sense of the term (i.e., neither the restrictions in paragraph 00030 or any other restriction defined herein apply). In some cases, the fabricated device may include features for controlling fluids in microfluidics applications. Microfluidic structures may include microchannels, micro-mixers, and micropumps for controlling and manipulating fluids. These structures may find application in lab-on-a-chip devices, biomedical analysis, and chemical processing. Further still, the material of the printed article may be selected in view of the chemistry of, or to be inert to, the fluid to be handled. The device may facilitate spectroscopic interrogation of the contained fluid.

Other applications may include refractory components, including but not limited to crucibles, molds, insulators, and other high-temperature devices. In some of these cases, the ionic material may be selected for resistance to thermal shock or chemical resistance.

I claim:

1. A method for additive manufacturing of a three-dimensional object from an ionic material, comprising:

determining a composition of a first fluid, the first fluid having a first solubility limit, and a composition of a second fluid, the second fluid having a second solubility limit;

wherein at least one of the first fluid and the second fluid further comprises the ionic material at a concentration below the first solubility limit in the first fluid or below the second solubility limit in the second fluid, providing a substrate submerged in the first fluid;

generating a recipe, the recipe defining locations where a volume of a second fluid should be dispensed from a printhead to deposit the ionic material on the substrate to create the three-dimensional object;

communicating the recipe to a controller, the controller generating commands for a motion system for moving the printhead along a printhead trajectory with respect to the three-dimensional object and commands to actuate the printhead;

dispensing the volume of the second fluid from the printhead in accordance with the recipe, the volume of the second fluid and a portion of the first fluid forming a mixing zone and the mixing zone having a third solubility limit, by operating the printhead in accordance with the recipe;

wherein the volume of the ionic material supplied by the portion of the first fluid and the volume of the second fluid exceeds the third solubility limit, causing a portion of the ionic material in the mixing zone to form a deposit on the substrate.

2. The method of claim 1, wherein the first fluid and the second fluid comprise hydrofluoric acid, and the ionic material is selected from the group consisting of calcium fluoride, magnesium fluoride, barium fluoride, cesium fluoride, and lithium fluoride.

3. The method of claim 1, further comprising:

determining a composition of a third fluid, the third fluid being designed to deposit a second ionic material when mixed with the first fluid;

defining the local composition of the three-dimensional object in the recipe;

operating the printhead to dispense the second fluid and the third fluid to selectively deposit the ionic material and the second ionic material in accordance with the recipe.

4. The method of claim 1, wherein a surface profile of the three-dimensional object is measured and the surface profile measurement is communicated to the controller, and the profile measurement is used to determine adjustments to at least one of the printhead trajectory, a flow rate of the second fluid, a dispense command, the composition of the first fluid, or the composition of the second fluid.

5. The method of claim 1, further comprising:

measuring a separation distance between the printhead and the thee-dimensional component;

communicating the separation distance to the controller; and adapting at least one of the separation distance and flow rate of the second fluid into the mixing zone, as to control the dimensions of the mixing zone where it contacts the three-dimensional object.

6. The method of claim 1, further comprising recycling an effluent fluid stream from the printhead to generate a supply of at least one of the first fluid and the second fluid, wherein the effluent is a mixture of the first fluid and the second fluid that is depleted of the ionic material; and the step of recycling includes at least one of changing a temperature, changing a composition, changing a pressure, or filtering.

7. The method of claim 6, wherein the step of recycling the effluent fluid steam includes saturating at least a portion of the effluent fluid stream with the ionic material at a first temperature, then changing the temperature of the portion of the effluent fluid stream, and wherein the change of temperature makes the portion of the effluent fluid stream subsaturated with the ionic material.

8. The method of claim 1, further comprising the step of determining a crystal orientation of the substrate with respect to a profile of the substrate, and orienting the profile of the substrate in the printer to align the crystal orientation with the printhead motion axes, such that the three-dimensional component is epitaxially deposited in the crystal orientation.

9. The method of claim 1, further comprising:

printing a first set of alignment features on a first surface of the substrate in accordance with the recipe;

removing the substrate from the printer;

installing a second substrate in the printer;

depositing a second set of alignment features on the second substrate in accordance with a second recipe, the second set of alignment features being designed to mate with the first set of alignment features;

installing the substrate on the second substrate using the first set of alignment features and the second set of alignment features; and printing on a second surface of the substrate in accordance with a third recipe.

* * * * *